Figure 1:
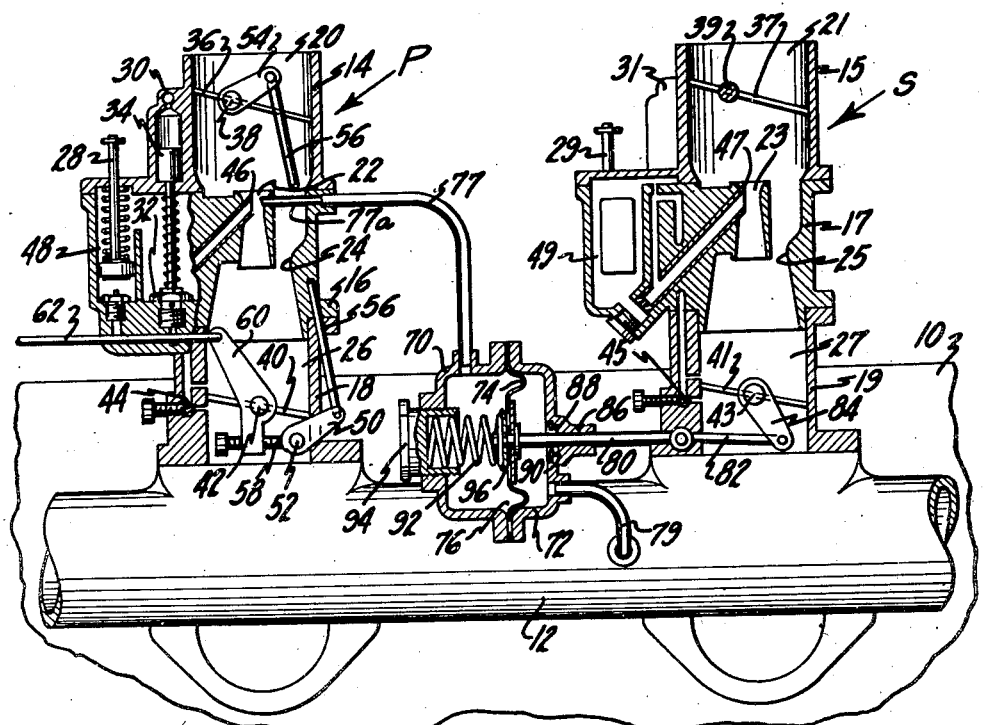

Nov. 2, 1948.     R. R. STREBINGER     2,452,698

CARBURETOR

Original Filed July 5, 1941

INVENTOR
RICHARD R. STREBINGER
BY
ATTORNEY

Patented Nov. 2, 1948

2,452,698

UNITED STATES PATENT OFFICE 2,452,698

CARBURETOR

Richard R. Strebinger, South Bend, Ind., assignor to Bendix Aviation Corporation, South Bend, Ind., a corporation of Delaware Original application July 5, 1941, Serial No. 401,170. Divided and this application June 30, 1944, Serial No. 542,978

4 Claims. (Cl. 261—23)

This invention relates to carburetors and more particularly to means for controlling the throttle valves in multiple stage carburetor systems for internal combustion engines, this application being a division of applicant's co-pending application for a carburetor Serial No. 401,170, filed July 5, 1941, now Patent No. 2,376,732 dated May 22, 1945.

Multiple stage carburetor systems for widely variable speed internal combustion engines such as are commonly used in automotive vehicles and the like may comprise either a plurality of separate carburetors or a single carburetor having a plurality of induction passages. In either arrangement there are a plurality of induction passages connected to a common intake manifold or to complementary manifolds, throttle valves for the respective induction passages, and means for controlling the throttle valves whereby they are opened progressively.

The general purpose of this type of carburetor system is to supply the engine with an economical fuel mixture from a primary source, which may comprise one primary induction passage or a plurality of said passages, throughout the lower speed range which in an automobile engine is used to the greatest extent, and to supply the engine with a supplementary mixture from one or more supplementary or auxiliary induction passages at speeds above said lower speed range, thereby increasing the volume of the mixture delivered to the engine to permit said engine to develop its maximum speed and power. This involves closing off the supplemental passage or passages when the engine is operating under low speed wide open throttle conditions, in order to furnish the engine with a mixture of combustible proportions under such conditions and permit very low speed operation without misfiring or stalling. The reason the engine will operate at lower speeds without missing when supplied with fuel mixture by one induction passage than when thus supplied by a plurality of passages is that the velocity of the air flowing to the engine through one passage is greater than if the same volume of air were flowing to the engine through a greater number of passages, and with greater velocity the air picks up more fuel and sustains said fuel until it reaches the engine cylinders.

The throttle valve for the primary induction passage or first state is manually controlled, being customarily connected with the accelerator pedal of the automobile. Various means have been employed to automatically control the remaining throttle valve or valves but such means have not proved entirely satisfactory in controlling a carburetor system of the multiple stage type so as to accurately meet the fuel mixture requirements of the engine under all operating conditions.

Among the automatic controls for the throttle valves of stages subsequent to the primary stage are various types of suction responsive means which may be connected to one or more of the induction passages. In carburetor systems using such vacuum responsive means for opening the throttle valves of supplemental induction passages, difficulty is sometimes encountered in effecting the closing of said valves particularly after said valves have been opened to a substantial degree.

It is therefore an important object of the invention to provide in a multiple stage carburetor system means for controlling the volume and fuel-to-air ratio of the fuel mixture according to the requirements of the engine throughout its operating range.

It is a further object of the present invention to provide means for effecting proper closing movement of the supplemental throttle valves of a multiple stage carburetor system employing automatic means for opening said valves, upon decelerating movement of the accelerator mechanism.

It is another object of the invention to provide a device of this character wherein the supplementary throttle valve or valves will be closed by manifold vacuum.

Still another object of the invention is to provide a device of this character wherein the throttle valves of supplementary stages are controlled by the position of the throttle valve of a preceding stage.

A further object of the invention is to provide a device of this character wherein the supplementary throttle valve or valves will normally be closed during the starting operation of the engine.

A still further object of the invention is to provide a device of this character wherein the supplementary throttle valve or valves will be positively closed upon closing of the primary throttle valve.

The characteristics and advantages of the invention are further sufficiently referred to in connection with the following detailed description of the accompanying drawings which represent certain preferred embodiments. After considering these examples, skilled persons will understand that many variations may be made without departing from the principles disclosed, and I contemplate the employment of any structures, arrangements or modes of operation that are properly within the scope of the appended claims.

Figure 2:
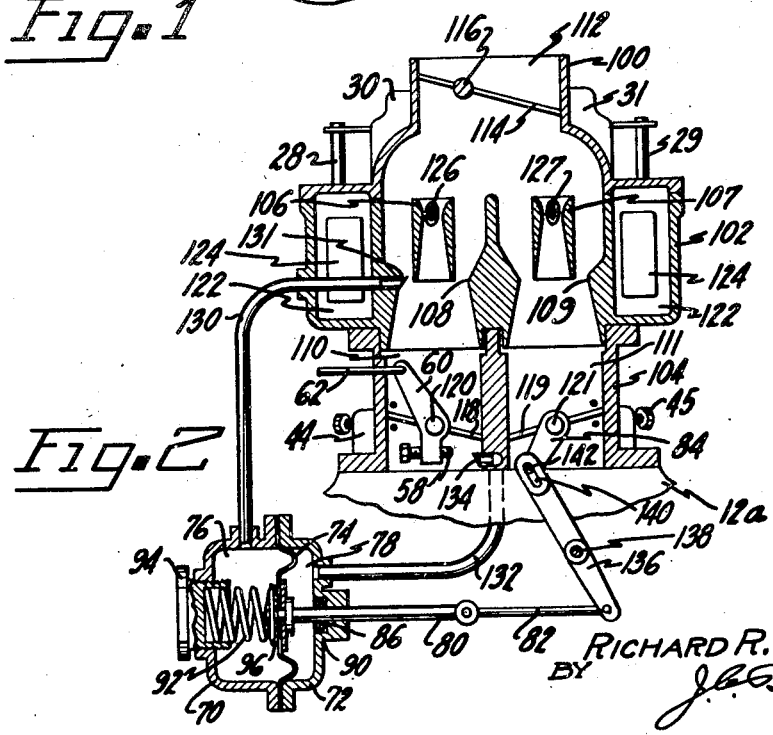

In the drawings:

Figure 1 is a fragmentary elevational view of an internal combustion engine provided with a multiple stage fuel induction system embodying the invention, said system comprising a plurality of independent carburetors shown in vertical section; and Figure 2 is a vertical section through an integral multiple stage carburetor embodying a modification of the invention.

While the invention is shown and described embodied in a multiple stage carburetor system having one primary and one supplemental or secondary induction passage it may also be embodied in such a system having a plurality of both primary and supplemental induction passages or a single passage for one stage and a plurality of passages for another stage or stages. It may also be embodied in a system of this character wherein the engine has a dual or multiple type of intake manifold, each part of which has connected therewith corresponding primary and supplemental induction passages.

Throughout the drawings, similar reference characters represent similar parts although where such parts are modified in structure and operation, they are given a further differing reference character.

Referring to Figure 1 reference numeral 10 indicates the engine and 12 the intake manifold thereof having a primary carburetor P and a secondary carburetor S attached thereto. The respective carburetors P and S comprise air horn sections 14 and 15, body sections 16 and 17, and throttle body sections 18 and 19. The induction passages of said carburetors include air entrances 20 and 21, small venturis 22 and 23, large venturis 24 and 25, and mixture passages 26 and 27 respectively. Acceleration pumps 28 and 29 and economizer systems 30 and 31 are provided in the respective primary and secondary carburetors, said economizer systems including a valve 32 and vacuum responsive means 34 controlling said valve.

The respective air entrances 20 and 21 are controlled by the usual unbalanced choke valves 36 and 37 on shafts 38 and 39, said valves being controlled by manual or automatic means, not shown, and the mixture passages 26 and 27 are controlled by respective throttle valves 40 and 41 on shafts 42 and 43. The choke valve 37 may be omitted if desired. The primary and secondary carburetors have idling systems 44 and 45 respectively and main fuel nozzles 46 and 47 supplied with fuel from fuel chambers 48 and 49 and discharging in the respective small venturis 22 and 23, in the known manner.

The primary carburetor is provided with a fast idle mechanism one type of which is illustrated in the drawings and which includes a fast idle cam 50 pivoted at 52 and connected with a choke valve lever 54 on shaft 38 by a rod 56. The cam 50 is engageable with a screw 58 in an extension of primary throttle lever 60 secured to one end of the shaft 42, said lever 60 being connected with the usual accelerator pedal or other operating member, not shown, by rod 62.

In Figure 1 the automatic means for controlling the secondary throttle valve 41 includes a casing comprising a pair of cup-like casing members 70 and 72 having a flexible diaphragm 74 marginally clamped therebetween, and thereby providing vacuum chambers 76 and 78 on the respective sides of said diaphragm, said chambers 76 and 78 being connected by respective conduits 77 and 79 with the small venturi 22 of the primary carburetor P and with the intake manifold 12. Conduit 77 may, if desired, terminate in an undercut suction tube 77a which extends into said venturi to increase the suction to said conduit 77 relative to the suction in the venturi. The diaphragm is suitably connected to one end of a valve actuating rod 80 having its other end connected by a link 82 with a throttle lever 84 attached to the secondary throttle shaft 43. The actuating rod 80 is slidably received in a boss or bearing 86 integral with casing member 72 and a sealing ring 88 in a recess 90 prevents leakage of air past said rod 80. A suitably calibrated spring 92 in chamber 76 reacts between an adjustable screw 94 and a metal washer 96 secured to the diaphragm 74 and yieldably urges the diaphragm in a direction which normally effects closing of the secondary throttle valve 41. The spring 92 is necessary to assure closing of the secondary throttle valve while the engine is being started as the engine should be supplied with fuel mixture only by the primary carburetor which is a normal one adapted to control the fuel mixture in the usual manner for starting and during the warming up period of engine operation.

The adjustment screw 94 provides means for varying the tension of spring 92 whereby the speed at which the secondary throttle valve begins to open is varied.

*Operation*

The primary throttle valve 40, being manually controlled, is the valve through which control of the engine speed is effected in accordance with the present invention. In a multiple stage carburetor system it is preferable to maintain the secondary throttle valve closed or substantially closed, as in the idling position, throughout the lower speed range which is customarily used to the greatest extent in an automobile or like vehicle, the primary induction passage supplying the engine with the required fuel mixture throughout said range. The upper limit of said range may be any desired predetermined speed, as for example, fifty miles per hour.

The vacuum device controlling the secondary throttle valve 41 is actuated by the differential of pressures on opposite sides of the diaphragm 74 and throughout the lower speed range the manifold vacuum, transmitted to chamber 78 through conduit 79 is sufficient with the assistance of spring 92 to overcome suction in the small venturi 22 of the primary induction passage, the suction in said small venturi being transmitted to chamber 76 through conduit 77 and increased by the air flow over the undercut tube 77a. However any other means for varying the pressure in conduit 77 relative to that in the induction passage may be employed.

When the primary throttle valve 40 has been opened beyond the position whereat it will permit enough fuel mixture to be supplied to the engine by the primary induction passage so that the engine speed increases beyond the upper limit of the lower speed range the vacuum in the intake manifold has dropped to a value whereat said vacuum combined with the pressure of spring 92 is insufficient to overcome the vacuum in the small venturi 22 transmitted to chamber 76. As a result the diaphragm will be initially drawn toward the left, as viewed in Figure 1, and the secondary throttle valve 41 will be opened accordingly. Increased opening of the primary throttle valve 40 will effect a corresponding additional opening of the secondary throttle valve 41 due to the further differential of pressures on opposite sides of the diaphragm 74 resulting in the increased engine speed and increased fluid flow through the primary induction passage and a relative drop in manifold vacuum caused by opening of the secondary throttle valve.

Under low speed wide open throttle conditions the pressure of spring 92, aided by the small manifold vacuum then present, is sufficient to close the supplementary or secondary throttle valve 41 so that the engine is supplied with its fuel mixture only by the primary induction passage. Consequently the velocity of the air in said induction passage is high enough to pick up and sustain sufficient fuel to provide the engine with a mixture of combustible proportions at very low speeds, said speeds being much lower than would be possible if both induction passages were functioning to supply the engine with fuel mixture under said low speed wide open throttle conditions.

When the engine is being operated at high speed with both throttle valves open and it is desired to decelerate, quick closing of the secondary throttle valve will be effected by closing or substantially closing the primary throttle valve. This function is effected by the sudden rise in manifold vacuum and the sudden drop in vacuum in the primary induction passage with the closing of the primary throttle valve. The suddenly increased manifold vacuum is transmitted to the chamber 78 while the vacuum in chamber 76 drops to or approximate zero. The diaphragm thereupon moves to the right and, aided by the pressure of spring 92, effects closing of the secondary valve 41.

From the foregoing it is obvious that the means for closing the secondary throttle valve includes a controlled force in addition to the spring 92 which is required because the pressure differential between the manifold vacuum and induction passage or Venturi vacuum is at times not very great and it is desirable that the secondary throttle valve be closed, as when the engine is operating at low speed wide open throttle conditions.

A modification of the invention is shown in Figure 2, said modification being embodied in an integral multiple stage carburetor hereinafter described although said modification may be embodied in a multiple stage carburetor system having a plurality of independent carburetors.

The integral carburetor shown in Figure 2 is attached to an intake manifold 12a and comprises an air horn section 100, body section 102 and a throttle body section 104. The primary and secondary induction passages comprise respectively small venturis 106 and 107, large venturis 108 and 109 and mixture passages 110 and 111, said induction passages having a common air entrance 112 controlled by an offset choke valve 114 mounted on a shaft 116 and controlled by the usual manual or automatic means.

The mixture passages 110 and 111 are controlled by the valves 118 and 119 respectively mounted on shafts 120 and 121, and a fuel chamber 122 having the usual float mechanism 124, supplies fuel to the main fuel nozzles 126 and 127 and to the idling systems 44 and 45.

Control of the supplementary or secondary throttle valve 119 is effected by a vacuum device of the same type as that shown in Figure 1. The chamber 76 of the device is connected with the large venturi 108 of the primary induction passage by means of a conduit 130 which may, if desired, terminate in an undercut suction tube 131 (as shown) extending into said venturi 108. The chamber 78 is connected with the mixture passage 110 of said primary passage by a conduit 132, which may terminate as shown in an impact tube 134, posterior to the trailing edge of the primary throttle valve 118 when said valve is closed. By means of the suction tube 131 and the impact tube 134 the pressures in conduits 130 and 132 respectively are varied relative to the pressure in the venturi 108 and chamber 110 and in the present instance a greater differential of pressures on opposite sides of the diaphragm 74 is effected. Obviously if desired the tubes 131 and 134 may be dispensed with and simple port structures used for one or the other of said tubes or a suction tube may be used instead of the impact tube 134 while an impact tube may be used in place of the suction tube 131.

The connection between the actuating device for the secondary throttle valve 119 and said valve includes a lever 136 pivoted at 138 and connected at one end with rod 82, the other end of said lever 136 being provided with a slot 140 in which is received a pin 142 fixed in secondary throttle lever 84 adjacent the end thereof. However any other suitable connection may be used between the secondary throttle valve and the actuating mechanism therefor.

The operation of the device shown in Figure 2 is as follows:

When the primary throttle valve 118 is closed or is in the idling position, the entrance or port of tube 134, which is posterior to the leading edge of said closed valve, is exposed to manifold vacuum which is relatively high and said manifold vacuum is transmitted to chamber 78 so that the pressure in said chamber is lower than the pressure in chamber 76 which is connected with the large venturi 108 of the primary induction passage in which the vacuum is very low. Consequently the supplementary throttle valve 119 is held tightly closed by the differential of pressures on opposite sides of the diaphragm 74, and by the pressure of spring 92, said throttle valve 119 being retained in the closed position throughout the lower speed range of the engine so that the latter is supplied with its fuel mixture throughout said lower speed range by the primary induction passage. Retention of the throttle valve 119 in the closed position is effected by locating the tube 134 so that its entrance will remain posterior to the valve 118 throughout the range of movement thereof whereby same normally controls the speed of the engine up to a predetermined value, such for example, as fifty miles per hour although the upper limit of the lower speed range of the engine may be any other desired value.

As the primary throttle valve 118 is opened the manifold vacuum decreases effecting a corresponding decrease in the suction in chamber 78 while the suction in the large venturi 108 of the primary carburetor increases with a corresponding increase of suction in chamber 76. However, until the trailing edge of the primary throttle valve passes the entrance of tube 134 the suction in chamber 76 will not be sufficient to overcome the suction in chamber 78 and the force of spring 92 so that the secondary throttle valve will not be opened. However, as soon as the leading edge of the primary throttle valve passes said entrance to tube 134 the latter is exposed to a region of relatively low suction and the suction in chamber 76 is sufficient to initially open the supplementary throttle valve 119. Further opening of the primary throttle valve 118 with the normal increase of engine speed will effect a further differential of pressures on the opposite sides of the diaphragm which will cause said diaphragm to move in a direction to effect further opening of the secondary throttle valve. Should the engine now be placed under a heavy load while both throttle valve are open the speed will decrease and upon decrease of the speed to a predetermined low value, spring 92, aided by suction in chamber 78, will overcome the decreased suction in chamber 76, and effect closing of the secondary throttle valve 119 so that the engine is then supplied with fuel mixture only by the primary induction passage.

If during normal high speed operation of the engine with both valves open, the primary throttle valve 118 is moved toward the closed position until the trailing edge thereof returns past the tube 134, the entrance to said tube is posterior to said valve 118 and is exposed to manifold vacuum which is higher than the vacuum then in the large venturi 108. The increased vacuum in chamber 78, together with the force of spring 92, effects quick closing of the secondary throttle valve.

While certain modifications of the invention have been shown and described, it is to be understood that one or more of the various features of one modification may be substituted for corresponding features of another modification, or may be added thereto.

For example, the conduits connecting the vacuum control unit and primary induction passage anterior to the throttle valve thereof may be connected with either large or small venturi adjacent the throat or at some other suiable part thereof or it may be connected with the induction passage at some other suitable location other than the venturis so long as it is anterior to the throttle valve and is exposed to a region wherein pressure within said induction passage will be varied by air flow in the passage.

In the embodiment shown in Figure 2 the tube 134 is located according to the degree of the valve opening desired before the adjacent edge thereof passes the entrance to said tube and it is to be noted that in any of the embodiments of the invention either an impact tube or a suction tube may be used for any of the connections of the control unit with the induction passages, or the conduits may terminate in simple ports.

It will be further understood that many other variations can be made from the disclosed embodiments and it is not intended that the scope of the invention shall be limited to the forms shown and described nor otherwise than by the terms of the appended claims.

I claim:

1. In a multiple stage carburetor system for an internal combustion engine, a primary and a secondary induction passage, throttle valves controlling said passages, a large and a small venturi in the primary induction passage, means for manually controlling the primary throttle valve, suction responsive means for controlling the secondary throttle valve, said last mentioned means having one connection with said small venturi, whereby suction in said venturi tends to open said secondary throttle and said means having another connection with the intake manifold whereby suction in said manifold tends to close said secondary throttle valve.

2. In a multiple stage carburetor system for internal combustion engines: a primary induction passage controlled by a throttle valve; a secondary induction passage controlled by a throttle valve; manual means for controlling the primary throttle valve; suction responsive means for operating the secondary throttle valve; a conduit connecting the last mentioned means with the primary induction passage anterior to the primary throttle valve and a second conduit connecting said means with a source of manifold vacuum, whereby said means tends to open the secondary valve upon an increase in suction anterior to the primary throttle valve and tends to close the secondary valve in accordance with manifold vacuum; and means adjacent the induction passage end of the first mentioned conduit modifying the suction in said conduit relative to that in the induction passage.

3. The invention defined by claim 2 wherein the means for modifying the suction in the conduit relative to that in the induction passage is adapted to increase said suction in said conduit relative to that in said passage.

4. In a multiple stage carburetor system for an internal combustion engine, primary and secondary induction passages, throttle valves controlling said passages, means in said primary induction passage anterior the primary throttle valve for creating suction varying with variations in the flow of air through the primary induction passage, means for manually actuating the primary throttle valve, and pressure-responsive means for controlling the secondary throttle valve including a movable wall having an operating connection with said latter valve, one side of said movable wall being subjected to suction created in the primary induction passage and the other side thereof being subjected to manifold vacuum.

RICHARD R. STREBINGER.

REFERENCES CITED

The following references are of record in the file of this patent:

UNITED STATES PATENTS

| Number | Name | Date |
|---|---|---|
| 1,519,081 | Cozette | Dec. 9, 1924 |
| 2,193,533 | Kishline et al. | Mar. 12, 1940 |
| 2,225,194 | Melcher | Dec. 17, 1940 |
| 2,269,930 | Ericson et al. | Jan. 13, 1942 |
| 2,315,183 | Bicknell et al. | Mar. 30, 1943 |
| 2,327,592 | Chisholm | Aug. 24, 1943 |
| 2,355,716 | Ericson et al. | Aug. 15, 1944 |